United States Patent [19]

Klein et al.

[11] Patent Number: 5,237,325
[45] Date of Patent: Aug. 17, 1993

[54] PROCESS AND SYSTEM FOR GATHERING AND EVALUATING MEASURED DATA

[76] Inventors: Hans-Christoph Klein, Hofheimer Strasse 22, 6231 Hattersheim; Peter Lohberg, Am Ringelsberg 7, 6382 Friedrichsdorf; Ludger Munch, Schmelzweg 17, 6238 Hofheim, all of Fed. Rep. of Germany

[21] Appl. No.: 859,351
[22] PCT Filed: Jul. 19, 1990
[86] PCT No.: PCT/EP90/01181
§ 371 Date: May 21, 1992
§ 102(e) Date: May 21, 1992
[87] PCT Pub. No.: WO91/07665
PCT Pub. Date: May 30, 1991

[30] Foreign Application Priority Data

Nov. 21, 1989 [DE] Fed. Rep. of Germany ....... 3938520

[51] Int. Cl.$^5$ .............................................. H03M 1/00
[52] U.S. Cl. ..................................... 341/155; 341/122; 364/550
[58] Field of Search ............... 341/141, 155, 122, 123; 364/550

[56] References Cited

U.S. PATENT DOCUMENTS 4,224,672  9/1980  Leleu et al.
4,987,539  1/1991  Moore et al. .................. 364/555 X
5,065,321  11/1991  Bezos et al. .................... 364/550 X
5,081,297  1/1992  Lebel et al. ..................... 364/569 X

FOREIGN PATENT DOCUMENTS 1551578  8/1979  United Kingdom.
2081909  2/1992  United Kingdom.

OTHER PUBLICATIONS

Design Ideas, "Transient Processor and Plotter Combined in One Unit", Design Engineering Aug. 1977, p. 27.
Dipl.-Ing. Manfred Vieten, "Erfassung Schneller MeBsignale mit dem Personal Computer, Elektronik", Feb. 21, 1986, pp. 113-117.

Primary Examiner—Howard L. Williams
Attorney, Agent, or Firm—Robert P. Seitter; J. Gordon Lewis

[57] ABSTRACT

A process and a system for multi-channel gathering and evaluation of measured data in which measured data channels are distinguished into analog data channels and into digital or event channels. By means of a signal derived from the events, or rather from event signals, and processed in the event channels the analog measured data are synchronously sampled, (i.e. picked up, converted into a digital value and stored). Each time an identification number is stored for the event signal triggering the sampling operation, or rather of the corresponding event channel, the phase time between this sampling signal and the preceding sampling signal, the associated sampled measured data and the time sequence of the sampling operations. The signal triggering the synchronous sampling operation is preferably formed by OR-linking of all event signals which are scaled down, if applicable.

18 Claims, 12 Drawing Sheets

| | | | | | | | |
|---|---|---|---|---|---|---|---|
| SIGNAL AMPLITUDES | ADC CHANNEL–1 | $A_{11}$ | $A_{12}$ | $A_{13}$ | $A_{14}$ | $A_{15}$ | $A_{16}$ |
| | ADC CHANNEL–2 | $A_{21}$ | $A_{22}$ | $A_{23}$ | $A_{24}$ | $A_{25}$ | $A_{26}$ |
| | ⋮ | | | | | | |
| | ADC CHANNEL–n | $A_{n1}$ | $A_{n2}$ | $A_{n3}$ | $A_{n4}$ | $A_{n5}$ | $A_{n6}$ |
| | INCREMENTAL CHANNELS (EVENTS) (CHANNEL SEQUENCE) | 5 | 1 | 3 | 2 | 4 | 1 |
| | PHASE TIME | 0 | $t_{51}$ | $t_{13}$ | $t_{32}$ | $t_{24}$ | $t_{41}$ |
| | EVENT NUMBER | 1 | 2 | 3 | 4 | 5 | 6 |

SAMPLED ANALOG SIGNAL CHANNELS

FIG. 3

PROCESS AND SYSTEM FOR GATHERING AND EVALUATING MEASURED DATA

BACKGROUND OF THE INVENTION

1. Field of the Invention

This invention relates to a process for multi-channel gathering and evaluation of measured data where analog measured data are picked up in parallel measured data channels, are converted into digital measured data and are stored in a memory for on-line or off-line evaluation. Also included in the subject matter of this invention is a system with measured data channels which are operated in parallel and which are independent of one another, namely with analog data channels, provided with individual analog-to-digital converters or with multiplexers having one common analog-to-digital converter at a time and with memories; with digital measured data channels, or rather with so-called event channels; as well as with circuits for controlling the gathering of the measured data.

DESCRIPTION OF THE PRIOR ART

Systems for multi-channel gathering and evaluation of measured data are already known (essay by M. Vieten, "Erfassung schneller Meßsignale mit dem Personal-Computer" Gathering fast measured signals by means of the personal computer, Elektronik, Heft volume 4/1986). Such systems, inter alia, are used in automotive engineering both for driving tests and for realizing digital multi-variable control units.

The measured value gathering systems, known by the term "transient recorders," are composed of a plurality of independent measured data channels operated in parallel. In general, each measured data channel is allocated a preamplifier stage of its own, an analog-to-digital converter of its own, and a data memory of its own. In principle, each channel is an individual device, with the special feature that all channels operate synchronously and are jointly controlled. For the purpose of gathering measured data, a momentary value of the signal applied to the measured data channel input is sampled in all channels in equidistant time steps, i.e., it is picked up and processed. After analog-to-digital conversion, the numerical values corresponding to these measured values are stored in a memory. Depending on the type of application or on the version of the system, the sampled values remain in the memory until "off-line" evaluation of the measured data, or they are further processed "on-line" at once; if so, they are overwritten by new data after a certain cycle time. A variety of different versions of apparatuses use this principle. For instance, instead of using one analog-to-digital converter at a time for each channel, it is possible to feed the analog measured data to a common analog-to-digital converter via a multiplexer in order to reduce cost. As the measured data have to be processed consecutively, this technique implies a lengthened processing time.

In these known measured data gathering systems working in accordance with the transient recorder concept, a sequence of numbers, or rather a sequence of measured values, is always gained as a function of time. This implies restrictions in case of technical operations where reference to time does not play any role or is only of minor importance and where the sensor used for generating the measured data is the incremental type. Then the information available from measuring is not in the signal amplitude but is contained in the alternating edges of binary signal conditions. For instance, the alternating edges of the signal at the output of a wheel speed sensor of an anti-skid control system mark the rolling angle and are independent of whether the wheel rotates quickly or slowly. In this case, time-equidistant sampling of the amplitude is particularly disadvantageous as it is necessary to work with a high sampling rate in order to detect the time of alternating edges with sufficient accuracy, although later on only one value will be evaluated, namely the time of alternating edges. Therefore, in such an application counters are often used which register the number of alternating edges occurring during one sampling interval. This number is then stored as the measured value. Thereby it is, admittedly, possible to save memory locations and to simplify evaluation; however, there remains the disadvantage that the phase relationship between the different events cannot be reconstructed, or rather is not evaluatable, any longer in order to gain certain information. As the measurements are based on the same time base, the resolution of the measured contents and the time required for measuring are extremely dependent on the wheel speed.

SUMMARY OF THE INVENTION

It is therefore an object of this invention to overcome the aforementioned disadvantages and to provide a process as well as a system for multi-channel gathering and evaluation of measured data which will be suitable for gathering analog and digital measured signals, in particular in the field of incremental measuring techniques, and which excels by high measuring precision, by high data reduction economy and, implied thereby, by a high storage economy as compared with transient recorders.

It has been found that this object can be achieved by means of a process of the type referred to above whose particular feature is that the measured data channels are distinguished or divided into analog data channels and into digital or so-called event channels. The analog data are synchronously sampled, i.e., picked up, processed (converted) and stored, by means of a signal derived from the events and processed in the event channels. The phase time between two subsequent sampling signals is measured and each time there are stored an identification number of the event signal triggering the sampling operation, (i.e., the corresponding event channel), the phase time between this sampling signal and the preceding one, the associated sampled values, (i.e., the sampled measured data), and the time sequence of the sampling operations.

A system for implementing this process of gathering and evaluating measured data is distinguished in that the pick-up, the processing or further handling and the storage of the measured values present in the individual analog data channels is synchronously controllable by means of a sampling signal derived from the event signals. The sampling signal further is fed to a channel decoder identifying the event channel of the event triggering the control signal, as well as to a phase time measuring unit detecting the time duration between two subsequent sampling signals. Each time a sampling signal comes up, the system can store the identification number (such as the number of the triggering event channel), the phase time between the preceding sampling signal and the latest one as well as the associated sampled values and the time sequence of the sampling operations.

Thus, an essential feature of this invention is the control of data gathering or sampling dependent on "events". Thereby decisive advantages are achieved as compared with the conventional transient recorder principle. As will become evident in more detail from the following, by means of corresponding linking and evaluation, it is possible to derive various information and measured values with a high degree of precision, as yet unrivalled, from the data stored according to this invention in a predetermined arrangement and sequence in the memory. At the same time, the capacities of the conventional transient recorder will be maintained. It is namely possible to include a "transient recorder track" at one input of the event channels by means of equidistant time signals; consequently, a transient recorder is one embodiment of the invention for gathering and evaluating measured data. In contrast to the transient recorder, however, it is possible to use not only the time as sampling quantity but also, additionally, any other sequence of events. For instance, the increments of the driven distance of a pulse wheel of an anti-skid control system or the signals of a Peiseler wheel may serve as event signals. According to this invention, the phase time between two subsequent pulses, representing the events in this case, are measured continuously. Independently of the driving speed, the computation of the instantaneous speed is always related to a distance unit of unchanging size. As it is possible to measure the phase time very precisely without great efforts the resolution of the measurement and the accuracy of the measurements now only depend on the quality and on the fineness of the incremental transducer. Because of taking a distance increment as a sampling interval, the sampling rate is automatically adapted to the driving speed. This will be of great advantage if measurements are to cover large measurement ranges such as is the case during driving tests. According to one embodiment of this invention, a system was constructed for gathering the measured data of a vehicle by means of which it was possible to measure instantaneous speeds, related to 1/1000 of rolling circumference, with 0.1% accuracy with driving speeds between 0.02 and 200 km/hr. Such a degree of accuracy is necessary in order to make use of the quality of 1%-class transducers. With the same degree of accuracy, according to this invention, it is also possible to determine driven distances, phases of position, twisting angles, linear movements or wheel slip relations and, simultaneously, to allocate the measured signals of analog channels to these data. Due to the high instantaneous value resolution it is possible to make visible even small changes, or rather fine details, and to alternatively represent them as a function of the driven time or of the driven distance.

According to one advantageous embodiment of this invention, the event channels have individual signal processing stages followed by event rate scaling-down units. The sampling signal is preferably formed by OR-linking of all event signals that have been processed and, if applicable, scaled down.

The phase time measuring unit of one embodiment of this invention contains a central counter which is reset and restarted by any event signal that has been processed and, if applicable, scaled down, each time the counter contents are transferred as phase time into the memory.

In a further embodiment, the invention is equipped with input stages of the same kind which comprise an input amplifier or preamplifier and a change-over device each of whose input signals are evaluatable as analog data and/or as event signals, depending on the operating position of the change-over device. Advantageously, additional signals, indicating the direction or the sign of a signal change, and marking signals—such as for zero marking—are fed to the input stages.

Further characteristics, advantages and applications of this invention will become evident from the following description of further details and from the accompanying illustrations.

BRIEF DESCRIPTION OF THE DRAWINGS

FIG. 3 shows a storing scheme for the measured data of the systems of FIG. 1 or FIG. 2;

DESCRIPTION OF THE PREFERRED EMBODIMENT

Figure 1:
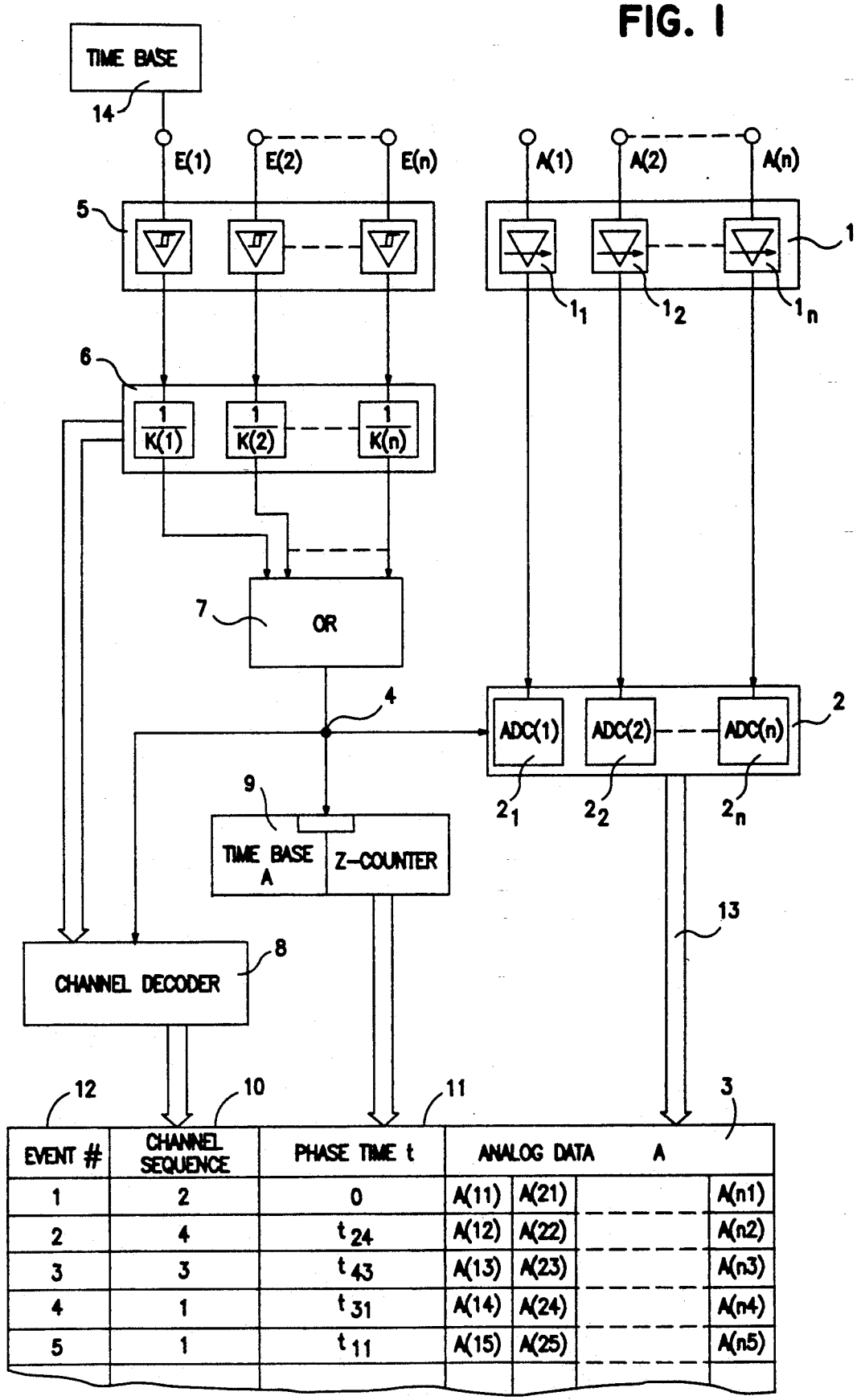
FIG. 1 is a block diagram of the fundamental structure of a gathering and evaluation system for measured data in accordance with this invention.

According to FIG. 1, this embodiment of a system for gathering measured data consists of a plurality of parallel analog data channels A(1), A(2), A(n), of event channels E(1), E(2), E(n), of a control part for generating a sampling signal 4 and of a memory with the analog data section 3 as well as with the memory locations 10, Il, 12 for the channel sequence (10), for the phase times (11) and for the sequence of events (12).

The analog measured data are fed to one analog-to-digital converter 2 ($2_1, 2_2, \ldots 2_n$) at a time via preamplifiers 1 ($1_1, \ldots 1_n$) associated with the individual channels. In accordance with another embodiment of this invention (not illustrated), a common analog-to-digital converter, instead of the individual analog-to-digital converters ($2_1, 2_2, \ldots 2_n$), is connected to the outputs of the preamplifiers $1_1 \ldots 1_n$ via a multiplexer. The values provided by means of the analog-to-digital converter(s) are transferred into the memory section 3 via a multiplexed line 13.

The inputs E(l) through E(n) of the event channels are followed by a block with the signal processing stages 5 associated with the individual event channels. The event signals are scaled down with the factors $1/K(l) \ldots 1/K(n)$ in an event rate scaling-down unit 6. As in many applications, in particular with regard to efficient memory exploitation, it is an advantage to evaluate only the K$^{th}$ event signal of a sequence of event signals as an effective event for triggering the sampling of the measured data. For instance, if an incremental distance transducer, connected to one of the event channel inputs E(n), delivers one pulse per millimeter of locomotion and if the scaling-down is set to be K=10, the effective event rate will be 1 centimeter. After having passed the event rate scaling-down unit 6, the effective events of all connected event channels E(n) are linked in a logical OR-stage 7 and will then jointly form the already mentioned sampling signal or control signal 4. In the present instance, a time base 14 such as the output signal of a clock or of a clock generator is connected to one of the inputs of the event channels, namely to input E(l). Thereby a time-periodical share is included in the control signal 4, which signal, in terms of time, is aperiodical. The time-periodical share generates a so-called "transient recorder track" within the analog data picked up, i.e., sampled, and stored in the memory system.

Essential components of the invention are a channel decoder 8 and a phase time measuring unit 9 both connected in parallel with the analog-to-digital converter 2 at the output of the OR-stage 7. Thus, the converter 2, the channel decoder 8 and the phase time measuring unit 9 are simultaneously actuated by means of any control signal or sampling signal 4. The channel decoder 8 has the effect that the identification number, or rather the associated channel number, will be ascertained for any effective event signal and will be stored as a channel sequence in section 10 of the data memory. The phase time measuring unit 9 measures the phase time between two subsequent events and stores the corresponding information as phase time in section II of the data memory. The phase time measuring unit 9 consists of a time base A and of a counter referred to as central counter in this case. The central counter 9 is reset and restarted upon any new incoming event signal of whatever channel origin and the contents of the counter, accumulated until that moment, are registered. Multiplied with the interval of time base A, there results the phase time which then is stored in section II of the data memory. The channel sequence and phase times are advantageously allocated in such a manner as to register the respective last phase time in combination with that channel number which has triggered the restart of the central counter. Thus, there results the vertical and horizontal allocation, represented in FIG. 1, of the data stored in the memory.

The phase time representing the time distance between two events can be determined very accurately in a simple way since only a fast-acting counter with a counting volume sufficient for the largest time distance of subsequent events is needed for this purpose.

Figure 2:
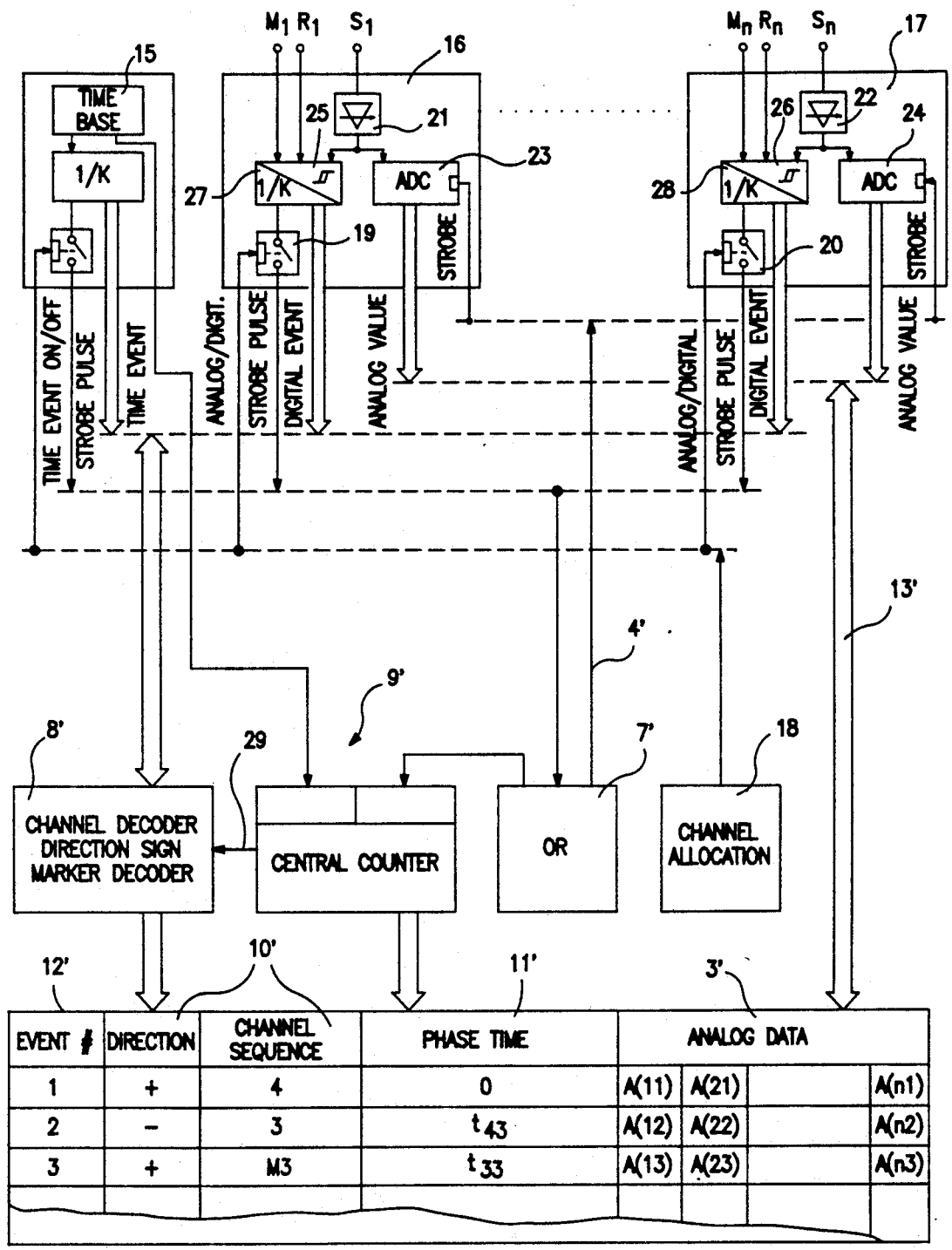
FIG. 2 is a further embodiment of the invention shown in FIG. 1.

In the embodiment of the invention represented in FIG. 2 only input stages 16, 17 of the same kind are provided beside one sole time base 15 which, just like time base 14 of FIG. 1, serves to form a "transient recorder track". Via a channel selection device 18 controlling the change-over devices 19, 20, the signal applied to the signal inputs $S_1, \ldots S_n$ of the input stages 16, 17 is evaluated either as an analog signal or as a digital signal, or rather as an incremental event, depending on the operating position of devices 19, 20. Via preamplifier stages, the input signals $S_1, \ldots S_n$ each is fed to analog-to-digital converter 23, 24 and to a signal processing stage 25, 26 which is connected in parallel with the converter and which also has an event rate scaling-down unit 27, 28. Consequently, the preamplifiers 21, 22 as well as the converters 23, 24 belong to the analog data channels. The preamplifiers 21, 22 likewise belong to the event channels as do the signal processing stages 25, 26 and the event rate scaling-down units 27, 28. The preamplifiers 21, 22 serve to process the two types of signals—the analog data and the event signals.

Depending on the operating position of the changeover devices 19, 20, the incremental share of the input signals $S_1, \ldots S_n$ is simultaneously evaluated as an event signal or—with the switch (19, 20) open—only the analog signal is processed.

The individual input stages 16, 17 have additional inputs $M_1, \ldots M_n; R_1, \ldots R_n$ which lead to the signal processing circuits 25, 26 of the event channels, by means of which it is also possible to feed the direction of a signal change $(R_1, \ldots R_n)$ and/or a mark such as a zero mark $(M_1, \ldots M_n)$.

For the rest of the system components, the embodiments as shown in FIGS. 1 and 2 are the same, which is expressed by the corresponding reference numerals 3', 4', 7' through 13'.

In the embodiment shown in FIG. 2, the time base 15 acts as an integrated switch-on event channel and furthermore supplies the central counter of the phase time measuring unit 9' with counting pulses. The channel decoder 8' also takes into consideration the direction, or rather the sign of direction, as well as the appearance of marking signals in addition to the channel information. Besides, the channel decoder 8' also reacts to overflow marks of the central counter which is symbolized by the arrow 29. In addition to the channel sequence, directions and markings are taken into consideration in section 10, of the memory system. This fact is indicated in the drawing by the symbols +, −, M.

In a slightly changed representation, FIG. 3 again illustrates the scheme in accordance with which the measured data are stored in order to enable an allocation of the sampled signal values to a certain event, a certain sequence of events or any other certain instant in time within the scope of the signal evaluation explained in even more detail in the following.

Figure 4:
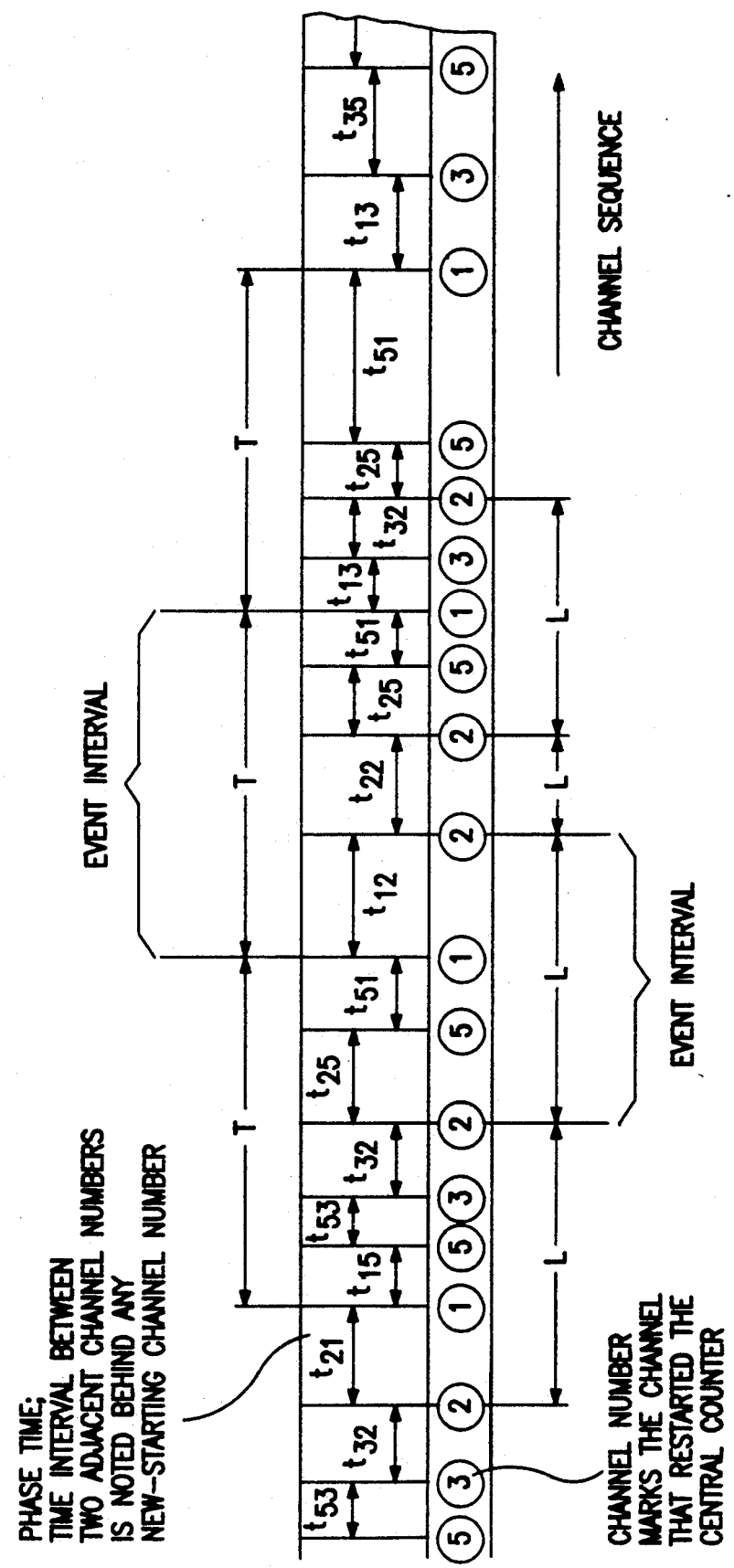
FIG. 4 Shows an example of data gathered by means of the invention—the form of representation being a time-continuous data chain.
Figure 5:
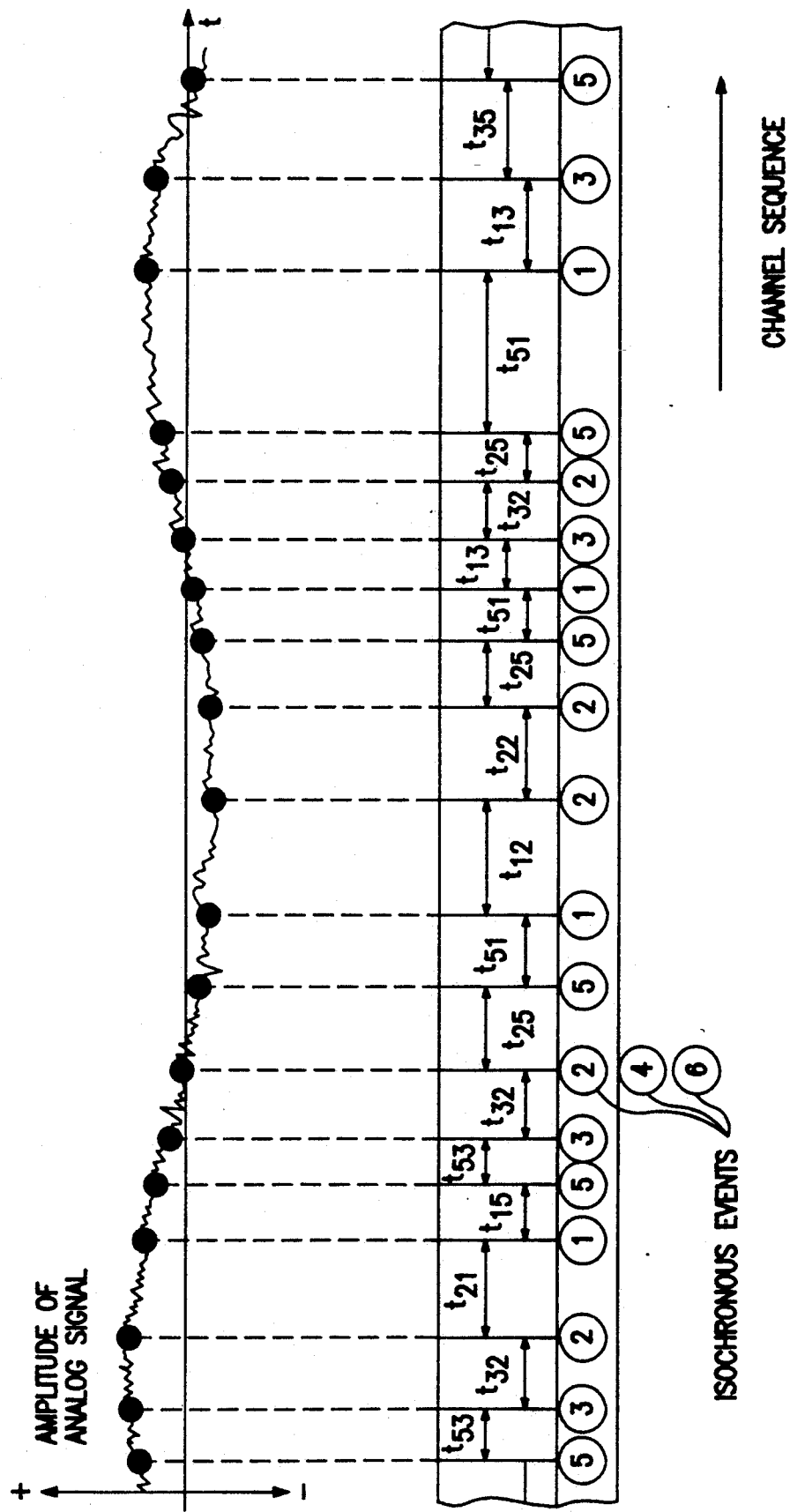
FIG. 5 shows an example similar to FIG. 4 with additional illustration of the sampled values of an analog data channel.

FIGS. 4 and 5 illustrate the selection and sequence of the data gathered and stored in accordance with the invention. In FIG. 4, the stored data, namely the channel identification numbers, or rather the channel numbers, and the phase times are illustrated in the form of a time-continuous data chain. FIG. 5 additionally also shows the measured values gained by means of an analog measured data channel and sampled and stored dependent on the "events".

In accordance with FIGS. 4 and 5 the same event interval is used between two like channel numbers. For instance, the event intervals of channel 2 could each correspond to a distance increment L=constant while the events transferred in channel 1 originate from a time base (time base 14 or 15 as shown in FIG. 1 or FIG. 2), with T=constant. FIGS. 4 and 5 illustrate that the conventional operation with constant time sampling rate is only a special case of the process and of the system in accordance with this invention. Of particular importance is that the exact phase relationships of all events are reconstructible for evaluation of the measured signals.

FIG. 5 shows the sampling of the measured values, or rather of the signal amplitudes, of an analog data channel by means of the event signals occurring in irregular sequence. For the sake of clarity, only one analog data channel is represented here. As a rule, there are several analog data channels which are sampled in parallel and synchronously, as described with reference to FIGS. 1 and 2. If there are several events in one time period defined by one sole central predetermined counter increment, these events will be treated as isochronous. What is registered is the multiple appearance of events without mutual phase time. An example of such a case is traced in FIG. 5 for the event channels 2/4/6. The known laws of "Shannon" describing the minimum requirements with regard to the sampling rate are also adhered to in the present instance when determining the central counter rate.

Figure 6A:
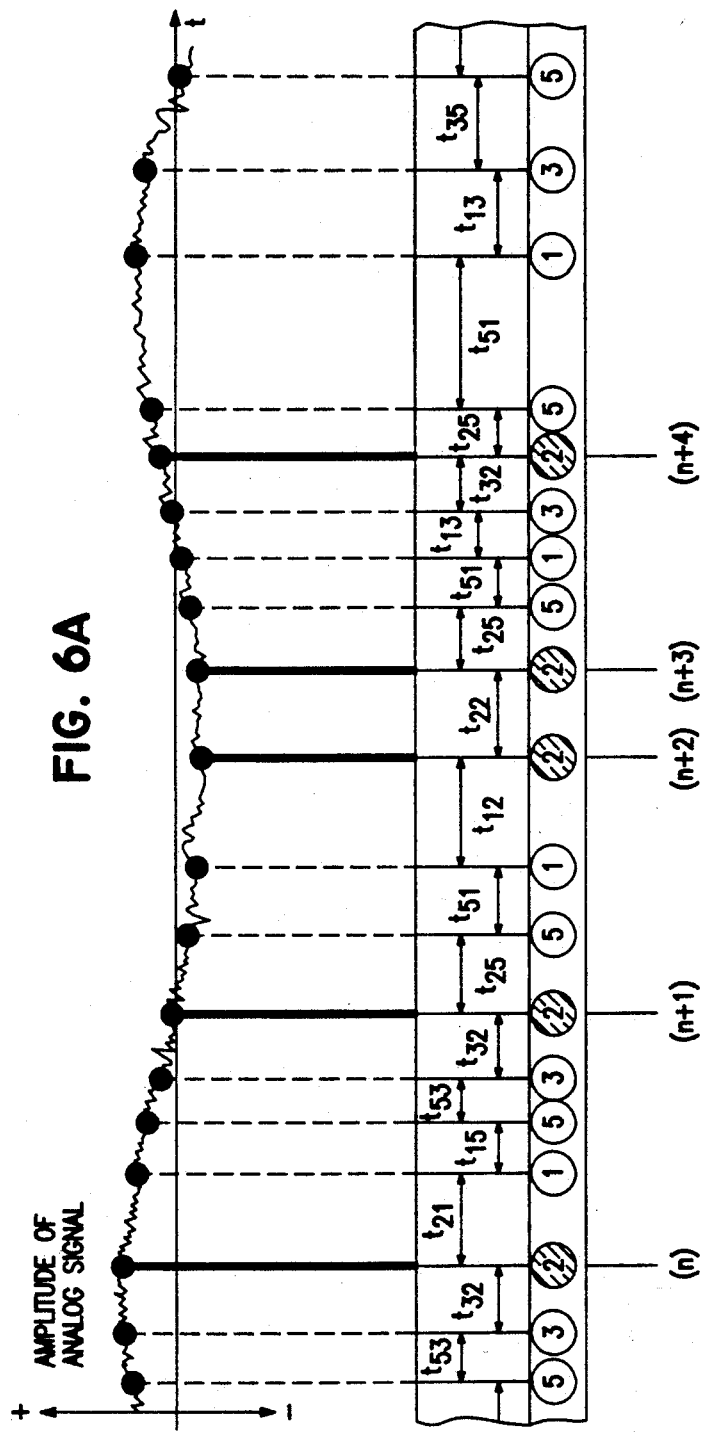
FIGS. 6A–9 show some examples for explaining the evaluability of the stored data, the representation being the same as in FIGS. 4 and 5 with additional diagrams (FIGS. 6A–8B)
Figure 6B:
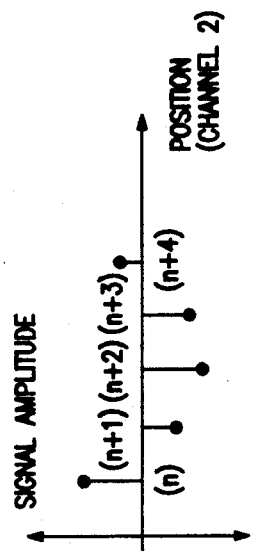

FIGS. 6A and 6B illustrate the structure of an analog channel evaluation on the basis of events of channel 2. By way of example, it is here assumed that these events are derived from the pulse wheel of a wheel speed sensor as used in automotive vehicles for anti-skid control, for example. Thus, by relating them to the wheel circumference, these events would be distance increments. In order to illustrate an analog operation as a function of the driven distance (position), the channel sequence is searched for the appearance of channel number 2 and the analog value, sampled and stored with regard to this event, is allocated. In the present instance that event channel which is the object of the searching operation (channel number 2) is termed "reference channel". At the same time, this channel is graphically allocated the X-axis (FIG. 6B). The other channel (analog channel or event channel) related to the reference channel is termed "related channel". In FIG. 6A, the Y-axis is allocated to this channel. Evaluating operations where sampled analog values are allocated to the reference channel events will here be given the term of function "FCT" (German abbreviation: "FKT").

Figure 7A:
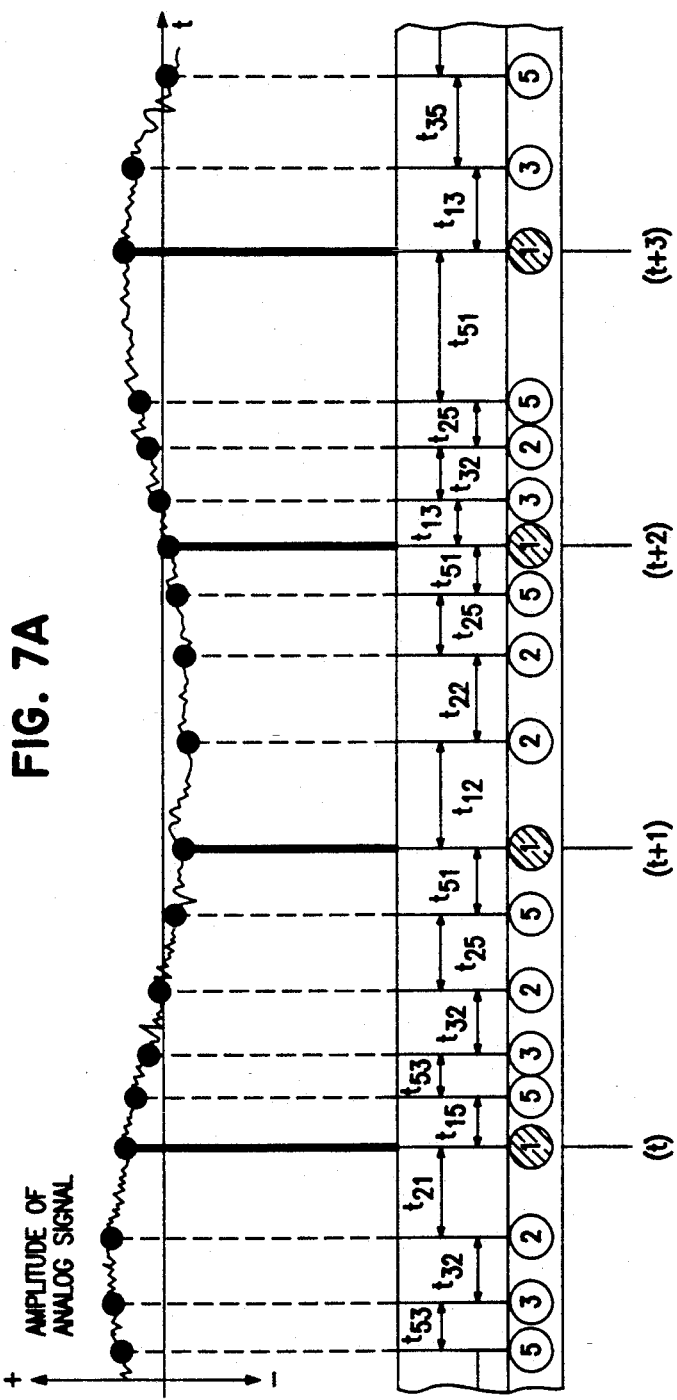
Figure 7B:
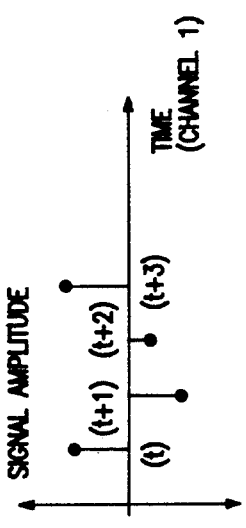

FIGS. 7A and 7B show the mode of operation of a conventional transient recorder is achieved by means of the inventive process (in addition to the other possibilities of evaluation). To this end, the signals of a time base (time base 14 in FIG. 1) are fed to an event channel upon pick-up. During the subsequent FCT procedure, this channel is selected as reference channel. In FIG. 7B, this is channel 1. The time event is recognized by the constant sum of phase times between the reference channel numbers.

Figure 8A:
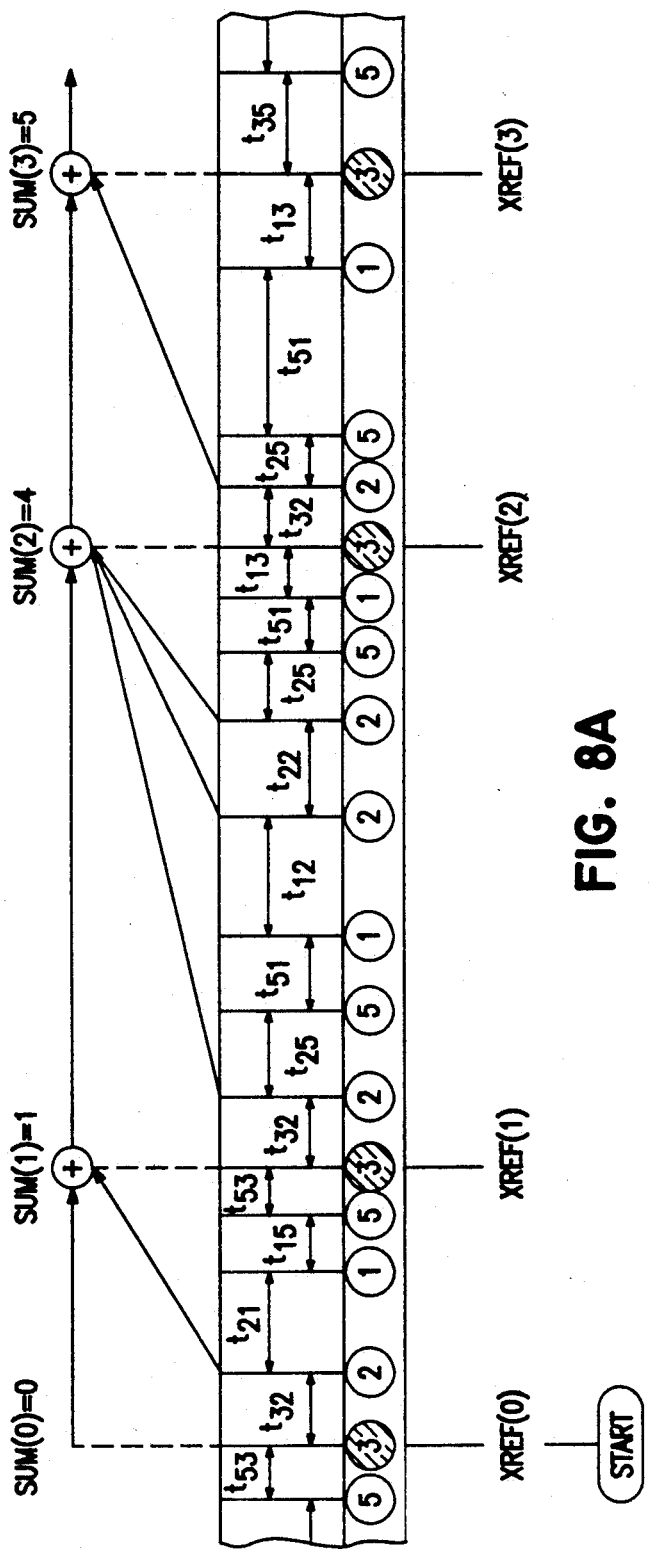
Figure 8B:
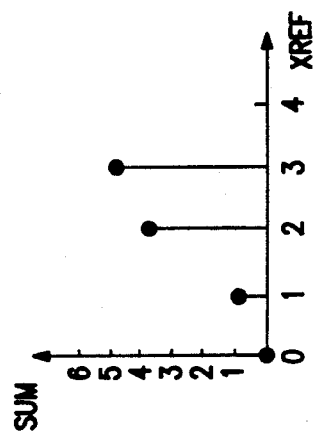

There are numerous further possibilities of evaluating the values gathered and stored in accordance with the inventive process. According to a procedure of evaluation, which is referred to as SUM/XREF and which is explained with reference to FIGS. 8A and 8B, two sequences of events are correlated. In the illustrated example, channel 3 is the reference channel and channel 2 is the related channel. The system counts how often a related-channel number appears per reference channel interval, this figure being balanced with the preceding value. Proceeding from a starting point, there will thus result the increment of the related events as a function of the increments of the reference channel. For instance, if the reference channel events are images of a wheel speed sensor pole wheel, arranged at the left front wheel of an automotive vehicle, and the related-channel events are those of a like pole wheel at the right front wheel, it is possible in this manner to directly illustrate the travel difference of the wheels of one axle during cornering of the vehicle.

Figure 9:
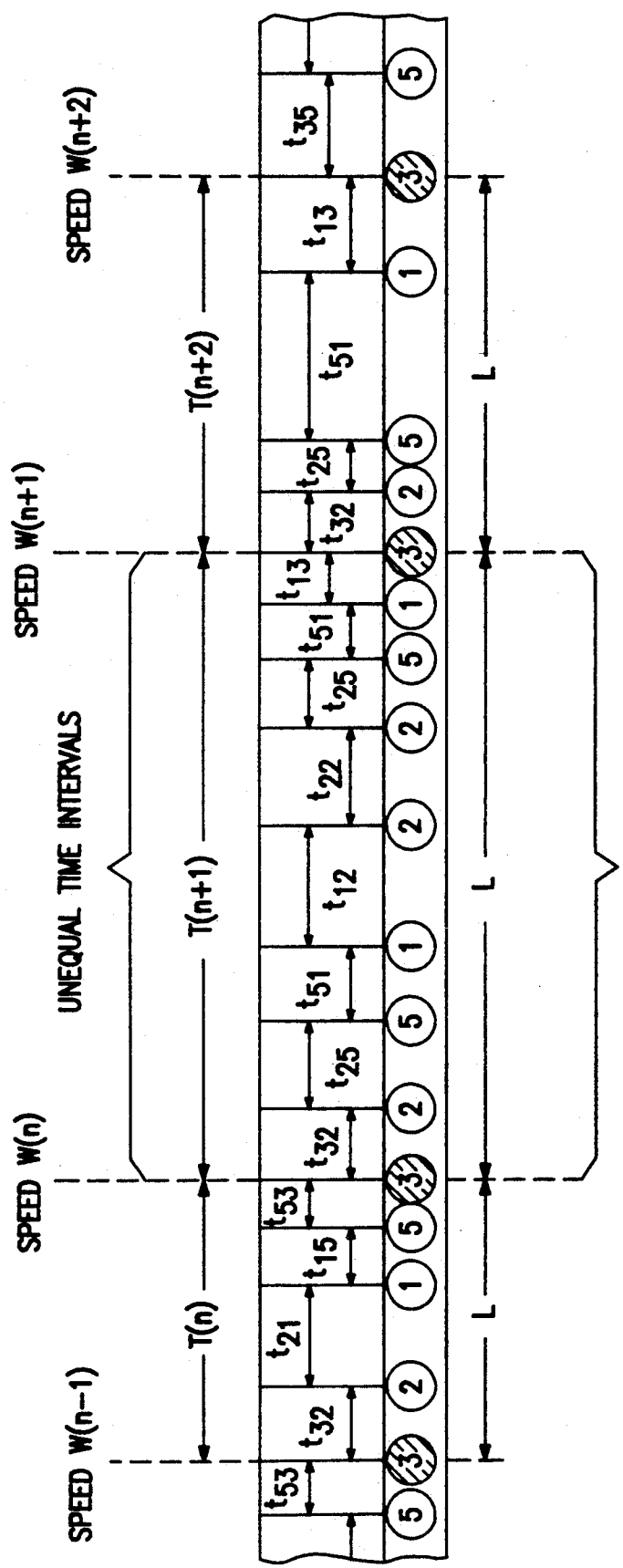

FIG. 9 relates to a procedure of evaluation referred to in this context by GESCHW (SPEED). It serves to compute and illustrate the momentary values of the event speed. To this end, the event interval of the channel under observation (channel 3 in the present example) is divided by the sum of the associated phase times. This operation corresponds to the formation of a time difference quotient with equal numerator differences, yet unequal denominator differences. By means of this procedure and the inventive process of determining the channel sequence and the phase time, the user has a simple means at hand in order to be able to determine accurate momentary speed values even in case of rougher pitch pulse generators (e.g., in case of pulse wheels of conventional wheel speed sensors of antiskid control systems), without the extent of memory locations and measuring time normally required for this purpose.

Figure 10:
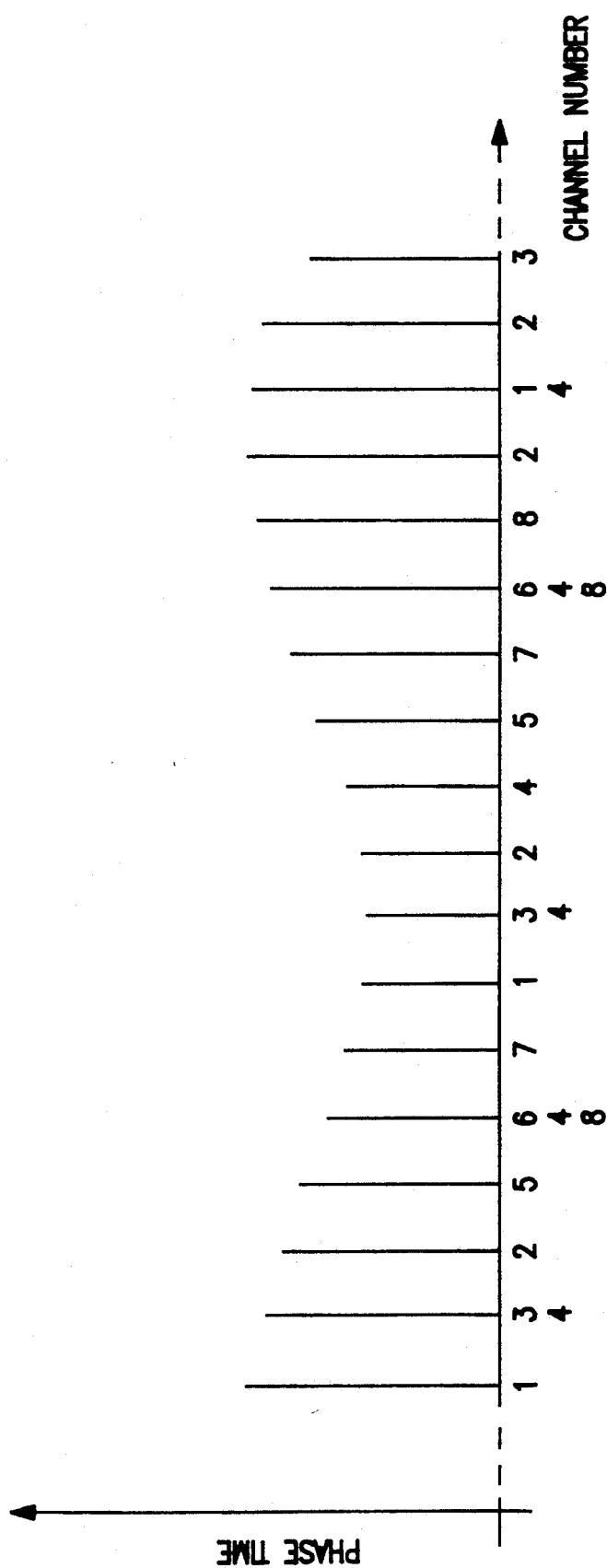
FIG. 10 is a diagram illustrating the evaluation procedure referred to as "channel sequence"

A procedure of evaluation called KANALFOLGE (CHANNEL SEQUENCE), explained with reference to FIG. 10, makes visible the sequence of the incoming events. To this end, the respective last phase time is traced as a function of that channel number which restarts the central counter. Events at different channels, which appear simultaneously within the physically implied resolution time, are recorded as parallel-appearing events with several channel numbers. KANALFOLGE (CHANNEL SEQUENCE) is well suited for analyzing measuring mistakes (e.g., a central counter overflow) and for making visible rhythmic event movements (such as frequency modulations).

The versatility of the inventive process can be explained with reference to another simple example. It is intended to ascertain the variation of the vehicle speed during a braking operation as a function of the braking distance, on the one hand and as a function of the driven time, on the other hand. The pulse wheel of a wheel speed sensor of an anti-skid control system serves as distance transducer. The signals of the sensor are applied to an event channel, channel 5 for instance. Additionally, the signals of a time base with a sufficiently high sampling rate are connected to another event channel, e.g., to channel 4. The GESCHW (SPEED) procedure of evaluation then directly supplies the representation of the vehicle speed as a function of the braking distance. If channel 5 is selected as reference channel and channel 4 as related channel, in an intermediary step, the SUM/XREF procedure (see FIG. 8A) supplies the time as a function of the braking distance. In a subsequent XY procedure (X=SUM/XREF; Y=-SPEED) the braking distance serves as linking quantity, and there results the second desired representation, namely the speed as a function of the driven time.

Figure 11:
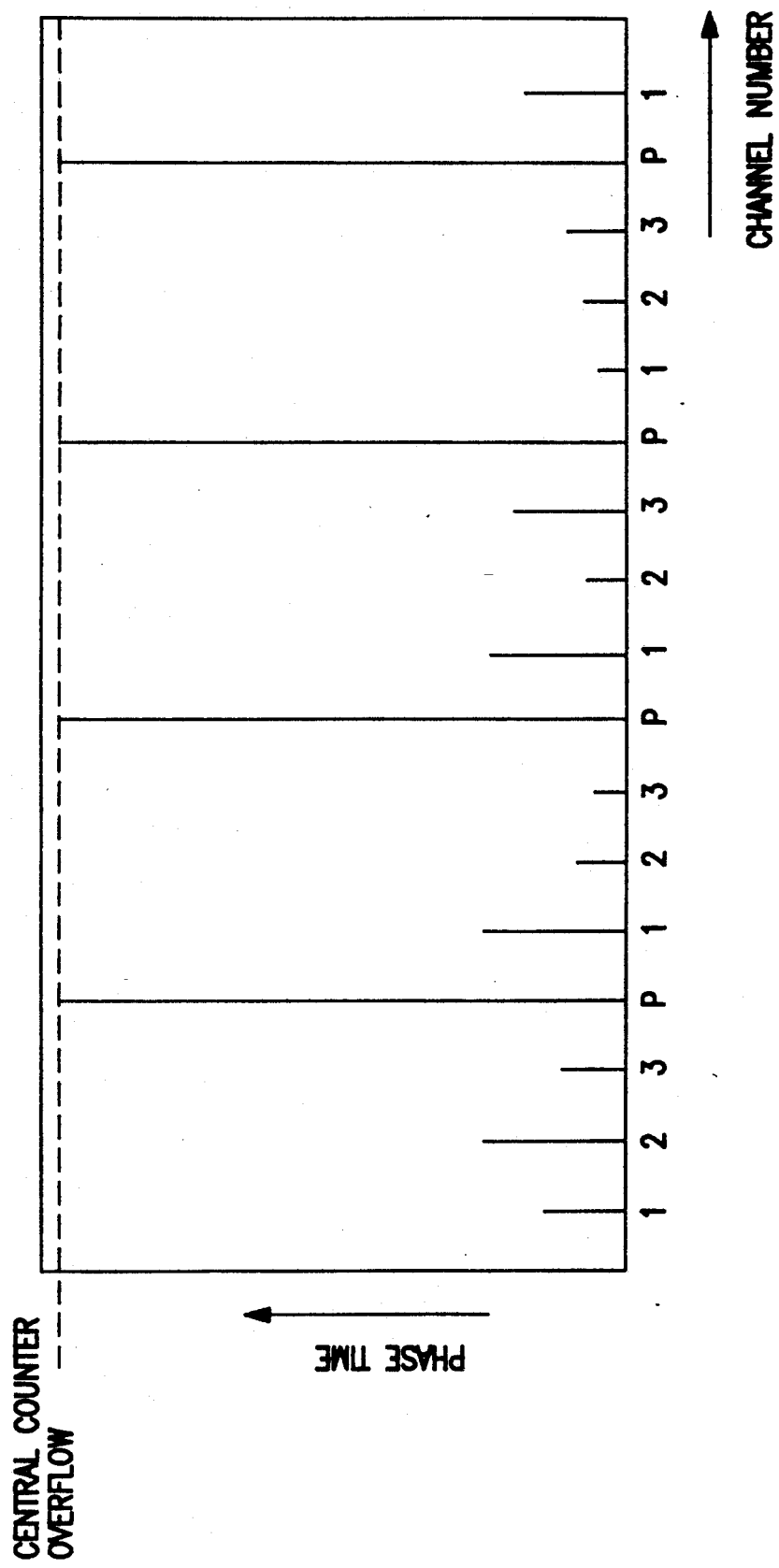
FIG. 11 is a similar illustration as FIG. 10 with evaluation of the central counter overflow.

Further, it is possible to write an overflow mark into the channel sequence by means of he overflow of the central counter and subsequently to restart the central counter at once (see FIG. 2). The overflow result now can be evaluated like any normal event signal. This has the advantage that the central counter is always able to work at the highest speed (with the highest resolution), without the fear that a central counter overflow might render the measurement unusable. Technically, it is possible to operate the central counter with a frequency corresponding to an integral multiple of the physically implied time required for setting the overflow mark. When evaluating the mark, it is possible to add again the increment corresponding to the setting mistake and thus to substantially compensate for the time mistake which is very slight. FIG. 11 illustrates a channel sequence with overflow marks P.

Figure 12A:
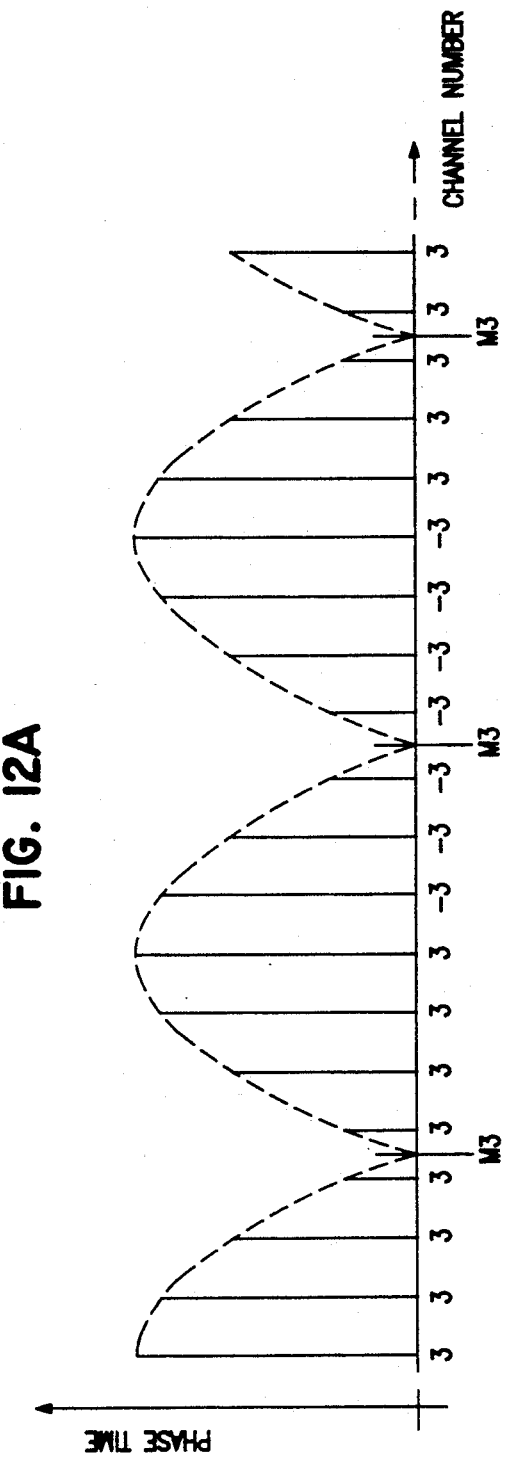
FIGS. 12A–12B shown an example of an embodiment of the invention where, additionally, the direction and a marking have to be taken into consideration for evaluating the signals.
Figure 12B:
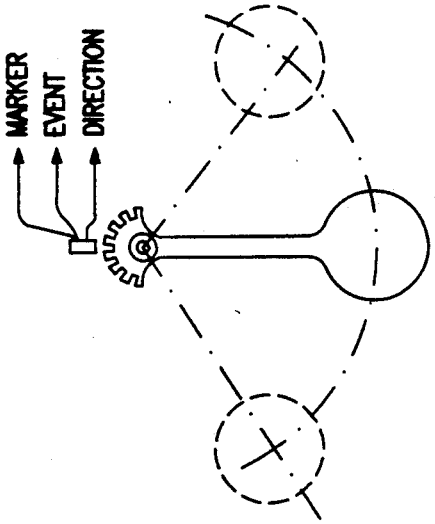

As already explained with reference to FIG. 2, it is also possible to take the "direction" of events into consideration. The driving direction, forwards or rearwards, plays a role in many technical situations such as during automotive vehicle driving tests. In other technical operations, the direction may change in respect of a reference condition. Incremental transducers available for measuring purposes are prepared for this requirement and deliver identification signals, beside the event signal, for the direction and for marking reference points such as the zero point. Instead of a direction signal, two event signals offset by 90° are delivered in some cases, the signals allowing the determination of the direction of movement. In the embodiment of the invention shown in FIG. 2, this now is simply taken into consideration in that the event direction is included in the channel sequence as a channel sign, and a marking input is provided as an additional, specially identified channel. FIGS. 12A and 12B show an example of a channel sequence which is gained from a pendulum motion by means of a suitable incremental transducer working on channel 3. The phase times are traced as neutral amounts. The reversal of the direction of the pendulum, chosen to be positive, is expressed by the negative sign of the channel number. The marker is traced as an additional channel identified as M3. The fundamental procedures of evaluation described above change only in that, during computation, a sign is considered, or rather in that additional relative conversions are carried out with regard to the position of the marker. Of course, a marker can also be a reference channel for other related channels. Those skilled in the art will have no difficulty in adapting the inventive process to their respective applications.

In the following, a description is given of a concrete example of an embodiment of the system for gathering and evaluating measured data, as shown in FIG. 1.

In this case, the system had 12 analog channels each of which was equipped with a 12-bit resolution analog-to-digital converter of its own. There were 8 event channels and one time base (14) which, in combination with one of the event channels, served to feed time events into the channel sequence. The time base worked within a range of 2 cycles up to 200 kilocycles per second. The event rate scaling-down units (6) were adjustable from 1 to 256. A 12-bit wide central counter with a time base of its own, ranging from 2 cycles up to 200 kilocycles per second, was provided for measuring the phase times. Each analog channel as well as the channel sequence memory section (10) were allocated a RAM-type memory of its own with a 128-kB-measured-data capacity so that 128,000 events could be recorded altogether. The gathering of measured data could alternatively be started by the appearance of an event signal or by a signal feedable by hand and stopped by hand at any time. If the sum of the incoming signal events reached a number of data memory locations, predetermined as a block, measurement was automatically interrupted.

Gathering, storage, evaluation and display of the measured data were computer-assisted. A software program containing all the above-described procedures was used for evaluating the channel sequence.

Further examples of applications of the invention are described below with reference to a test vehicle equipped with (wheel speed) sensors and with the inventive measured data gathering system. Braking pressures, bump travels etc. were measured via the analog channels. Connected to the event channels were wheel speed pulse generators (Peiseler wheels) generating 1000 pulses per revolution and thus capable of resolving the rolling distance up to approximately 1.6 mm. The following list includes some of the possible measurement configurations:

Measurements as a function of the driven distance (position):
Occupancy: 1 event channel with a wheel pulse generator with an event rate scaling-down of K=250; all 12 analog channels;
Applications: measurements along a distance of approximately 50 km, with any driving speed (temporarily even zero speed) and with a sampling of the analog data channels approximately every 40 cm.
Occupancy: 5 event channels, namely four wheel pulse generators with an event rate scaling-down of K=1; 1 driving speed transducer;
Applications: measurement of driven distance and wheel rolling distances with 1.6 mm accuracy; at the same time, gathering of instantaneous values of vehicle and wheel speeds, or rather wheel slip measurements with similar resolution.

Measurements as a function of time:
By means of setting the central counter speed the maximum time resolution can be 0.025% of the event period in case of events with, on average, constant event speed. This applies to period durations of 10 milliseconds up to 2000 seconds.
Occupancy: 1 event channel with the internal time base (14 in FIG. 1); all 12 analog channels.
Applications: a 12-channel transient recorder is formed with a 128-kB-measured-data capacity per channel, which recorder is to be operated with a sampling frequency of 200 kilocycles.

According to one variation of the described embodiment, four analog channel input stages were fed each to one common analog-to-digital converter via a multiplexer. An alternating buffer was used to generate a continuous flow of measured data to a mass storage. In this case, the measured data gathering system had two smaller RAM-type memories (buffers) organized in the same way. While the first buffer picked up measured data, the second one transferred the data to the mass storage and vice versa.

In this way, it was possible to transfer the data on the channel sequence, phase time etc.—beside the sampled analog values—continuously to a large capacity mass storage.

The basic idea of the described inventive process and of the principle of the corresponding system for gathering and evaluating measured data thus are that the "events" of all incremental sensors connected to the event inputs and, if applicable, the pulses of an additional internal time base trigger a sampling operation in the time sequence of their appearance in a manner which may be scaled down, if applicable. Thereby all analog signal channels are synchronously sampled in the way of a flash photograph. As the events are not synchronized with regard to time, sampling is non-equidistant as a rule. If, furthermore, a time base is connected whose time signals are equidistant, then a transient recorder track, as it were, is superimposed on the measuring operation. In combination with sampling of the measured data applied to the analog data channels, the channel sequence in which the sampling operations are triggered and the time interval (phase time) which has passed between two sampling events are simultaneously registered. The measured data then will be stored in accordance with a scheme illustrated in a particularly clear way in FIG. 3 so that the subsequent allocation of the sampled signal values to a certain event, a certain sequence of events or to a certain time is possible.

What is Claimed:

1. A method for gathering and making available for evaluation measured data comprising the steps of:

supplying, from a plurality of parallel and independent analog data channels and a plurality of event channels, analog data signals and event data signals representative of measured data, said event data signals having identification numbers corresponding to the event channels with which said event data signals are associated;

generating successive sampling signals in response to event data signals from at least one event channel;

sampling analog data signals from the analog data channels synchronously in response to each sampling signal and converting sampled analog data signals into digital data signals representing digital measured data;

measuring a time interval between successive sampling signals;

determining the identification number for the event channel providing the event data signal which causes generation of the sampling signal; and storing the time interval, the digital measured data, and the respective identification number, for each sampling operation and making availalable for evaluation the stored digital measured data.

2. A method as set forth in claim 1, wherein the step of generating successive sampling signals comprises the steps of:

assigning each event channel to one of first and second groups;

generating a sampling signal in response to each event data signal received from an event channel in said first group;

counting the number of event data signals received from each individual event channel in said second group; and generating a sampling signal for each individual event channel in said second group when a predetermined number of event data signals are received from said channel.

3. A system for gathering and making available for evaluation measured data comprising:

means, including a plurality of parallel and independent analog data channels and a plurality of event channels, for supplying analog data signals and event data signals representative of measured data, said event data signals having identification numbers corresponding to the event channels with which said event data signals are associated;

means for generating successive sampling signals in response to event data signals from at least one event channel;

means for sampling analog data signals from the analog data channels synchronously in response to each sampling signal and for converting sampled analog data signals into digital data signals representing digital measured data;

means for measuring a time interval between successive sampling signals;

means for determining the identification number for the event channel providing the event data signal which causes generation of the sampling signal; and means for storing the time interval, the digital measured data, and the respective identification number, for each sampling operation and for making availalable for evaluation the stored digital measured data.

4. A system as set forth in claim 3, wherein said sampling signals generating means include means for generating a clock signal which is coupled to one of the plurality of event channels.

5. A system in accordance with claim 3, wherein said sampling signal generating means include:

means for counting the event data signals from each individual event channel; and means for generating a sampling signal for each individual event channel when a predetermined number of event data signals have been counted for that event channel.

6. A system as set forth in claim 3, wherein said sampling signals generating means include:

means for assigning each event channel to one of first and second groups;

means for generating a sampling signal in response to each event data signal received from an event channel in said first group;

means for counting the number of event data signals received from each event channel in said second group; and means for generating a sampling signal for each event channel in said second group when a predetermined number of event data signals are received from said channel.

7. A system in accordance with claim 3 wherein said time interval measuring means include:

means for supplying clock signals;

means for counting said clock signals;

means responsive to said sampling signals for conducting to said storing means the count of said clock signals each time a sampling signal is generated and for resetting said counting means each time a sampling signal is generated.

8. A system for gathering and making available for evaluation measured data comprising:

means, including a plurality of parallel and independent channels, for supplying analog data signals and event data signals, said event data signals having identification numbers corresponding to the channels with which said data signals are associated;

means for allocating each independent channel as one of event and analog data channels, corresponding to the data supplied by said channels;

means for generating successive sampling signals in response to event data signals from at least one independent channel allocated as an event channel;

means for sampling analog data signals from the independent channels allocated as analog data channels synchronously in response to each sampling signal and for converting sampled analog data signals into digital data signals representing digital measured data;

means for measuring a time interval between successive sampling signals;

means for determining the identification number for the independent channel providing the event data signal which causes generation of the sampling signal; and means for storing the time interval, the digital measured data, and the respective identification number, for each sampling operation and for making available for evaluation the stored digital measured data.

9. A system in accordance with claim 8 further comprising:

means for supplying direction signals representative of a direction of change for the analog measured data; and means for supplying reference signals representative of reference values for said analog measured data, and wherein said storing means store and make available for evaluation said direction and reference values.

10. A process for multi-channel gathering and evaluation of measured data where analog measured data are picked up in parallel measured data channels, are converted into digital measured data and are stored in a memory for on-line or off-line evaluation, with the analog measured data in the parallel measured data channels being synchronously sampled by a digital sequence of signals or sequence of events, characterized in that the measured data channels are distinguished or divided into analog data channels and in digital or so-called event channels, in that the synchronous sampling, i.e. picking-up, processing and storing of the measured data obtained in the analog measured data channels is controlled by way of the signal (4, 4') derived from the events and processed in the event channels, in that the phase time ($t_{nm}$) between two subsequent sampling signals is measured, and in that each time there are stored an identification number of the event signal triggering the sampling operation, or rather of the corresponding event channel, the phase time ($t_{nm}$) between this sampling signal and the preceding one, and the appertaining sampled values or sampled measured data (A(nm)).

11. A process as claimed in claim 10, characterized in that the sampling signal (4, 4') is formed by OR-linking of event signals and/or of event signals scaled down.

12. A system for implementing the gathering and evaluation of measured data, with measured data channels which are operated in parallel and which are independent of one another, namely with analog data channels, provided with individual analog-to-digital converters or with multiplexers having one common analog-to-digital converter at a time and with memories; with digital measured data channels or with so-called event channels; as well as with circuits for controlling the sampling operation and the gathering of the measured data, characterized in that the pick-up, the processing or further handling and the storage of the measured values present in the individual analog data channels is synchronously controllable by means of a sampling signal (4, 4') derived from the event signals; in that the sampling signal further is feedable to a channel decoder (8, 8') identifying the event channel of the event triggering the sampling signal as well as to a phase time measuring unit (9, 9') detecting the time duration ($t_{nm}$) between two subsequent sampling signals (4, 4'); and in that each time a sampling signal (4, 4') comes up there can be stored the identification number such as the number of the triggering event channel and the phase time ($t_{nm}$) between this sampling signal and the preceding one as well as the appertaining sampled values.

13. A system in accordance with claim 12, characterized in that there is provided an event channel which a time base (14, 15) is connected to.

14. A system in accordance with claim 12, characterized in that the event channels have individual signal processing stages (5, 25, 26) followed by event rate scaling-down units (6, 27, 28).

15. A system in accordance with claim 12, characterized in that the sampling signal is formed by OR-linking (OR-stage 7, 7') of all event signals that have been processed or, if applicable, scaled down.

16. A system in accordance with claim 12 characterized in that the phase time measuring unit (9, 9') contains a central counter which is reset and restarted by any event signal that has been processed and, if applicable, scaled down, each time the counter contents being transferable as phase time into the memory (11, 11').

17. A system in accordance with claim 12, characterized in that the same is equipped with input stages (16, 17) of the same kind which comprise an input amplifier or preamplifier (21, 22) and a change-over device (19, 20) each and whose input signals are evaluatable as analog data and/or as event signals, depending on the operating position of the change-over device (19, 20).

18. A system as claimed in claim 17 characterized in that additional signals (inputs R1, R2), indicating the direction or the sign of a change, and marking signals (inputs $M_1$, $M_2$)—such as for zero marking—are feedable to and evaluatable in the input stages (16, 17).

* * * * *